United States Patent
Becker et al.

(10) Patent No.: US 7,166,331 B2
(45) Date of Patent: Jan. 23, 2007

(54) PROCESS FOR THE PRODUCTION OF MULTI-LAYER COATINGS COMPRISING A WATERBORNE PRIMER-SURFACER LAYER AND A TOPCOAT APPLIED THERETO

(75) Inventors: Michael Becker, Remscheid (DE); Werner Bosch, Wuppertal (DE); Thimo Lothert, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 15 days.

(21) Appl. No.: 10/842,218

(22) Filed: May 10, 2004

(65) Prior Publication Data

US 2005/0249881 A1 Nov. 10, 2005

(51) Int. Cl.
*B05D 3/02* (2006.01)
*B05D 7/16* (2006.01)

(52) U.S. Cl. .................... 427/409; 427/384; 427/388.1

(58) Field of Classification Search ............. 427/372.2, 427/377, 378, 379, 384, 388.1, 407.1, 409
See application file for complete search history.

(56) References Cited

U.S. PATENT DOCUMENTS

| | | | |
|---|---|---|---|
| 2,472,293 A * | 6/1949 | Groven .......................... 34/60 |
| 5,047,294 A | 9/1991 | Schwab et al. |
| 5,210,154 A | 5/1993 | Weidemeier et al. |
| 5,589,228 A | 12/1996 | Wegner et al. |
| 6,221,949 B1 | 4/2001 | Gross et al. |
| 6,546,647 B2 * | 4/2003 | Speck .......................... 34/468 |
| 6,548,119 B1 | 4/2003 | Siever et al. |
| 2003/0212163 A1 * | 11/2003 | Awokola et al. ............ 522/150 |
| 2005/0061677 A1 * | 3/2005 | Lehmann et al. ........... 205/224 |

FOREIGN PATENT DOCUMENTS

WO   WO 0035600 A1   6/2000

OTHER PUBLICATIONS

The International Search Report and Written Opinion of the International Searching Authority, Application No. PCT/US2005/015273, Mailed: Nov. 21, 2005.

* cited by examiner

*Primary Examiner*—William Phillip Fletcher, III

(57) ABSTRACT

A process for producing multi-layer coatings comprising a waterborne primer-surfacer layer and a topcoat applied thereto on substrates, in which a waterborne primer-surfacer layer is applied from a waterborne primer-surfacer to substrates and baked and then a topcoat is applied, wherein the waterborne primer-surfacer has a binder solids content with a hydroxyl number of 100 to 250 mg KOH/g and contains free or blocked polyisocyanate as a curing agent (crosslinking agent) for the hydroxy-functional binder(s) in a molar ratio of OH/NCO of more than 2:1 to 5:1, and wherein, after it has been applied and before baking, the waterborne primer-surfacer layer is allowed to evaporate for 30 to 300 seconds at 15 to 40° C.

7 Claims, No Drawings

PROCESS FOR THE PRODUCTION OF MULTI-LAYER COATINGS COMPRISING A WATERBORNE PRIMER-SURFACER LAYER AND A TOPCOAT APPLIED THERETO

BACKGROUND OF THE INVENTION

1. Field of the Invention

The invention relates to a process for the production of multi-layer coatings comprising a waterborne primer-surfacer layer and a topcoat applied thereto.

2. Description of the Prior Art

Today's automotive coatings generally comprise an anticorrosive electrodeposition primer, a primer-surfacer layer (intermediate coating layer having an antichipping and leveling function) which is applied thereto and a final color and/or special-effect topcoat in the form of a one-layer topcoat or a two-layer coat comprising base coat and clear coat.

In many coating plants for the application of multi-layer coatings of this kind, solvent-borne primer-surfacers are applied by spraying. For reasons of environmental protection, the intention is to replace these by waterborne primer-surfacers. However, this is not readily possible using the hitherto known waterborne primer-surfacers, because the pre-drying conditions for primer-surfacer layers in coating plants for applying primer-surfacers based on organic solvents (non-aqueous primer-surfacers) are different from those in coating plants specifically designed for applying waterborne primer-surfacers. In coating plants designed for applying primer-surfacers based on organic solvents, the primer-surfacer layers are first allowed to evaporate (flash-off) for 30 to 300 seconds, for example, at air temperatures of 15 to 40° C. after the application and before they are baked.

Waterborne primer-surfacers, on the other hand, require in addition to the evaporation, a pre-drying step at elevated air temperatures in order to produce a pre-dried waterborne primer-surfacer layer which allows subsequent baking without blistering (cf. examples sections in U.S. Pat. No. 5,047,294 and U.S. Pat. No. 5,210,154 and the dictionary Römpp-Lexikon Lacke und Druckfarben, N.Y., Thieme 1998; headword "Hydrofüller"). In coating plants for applying waterborne primer-surfacers, the phase serving for evaporation and pre-drying lasts, for example, a total of 11 to 19 minutes and the air temperatures used are, for example, in the range from 20 to 100° C. For example, coating layers applied from waterborne primer-surfacers are initially allowed to evaporate for the purpose of sufficient pre-drying for 1 to 5 minutes at 20 to 26° C. and then pre-dried for 10 to 14 minutes with warm air of 60 to 100° C.

The evaporation times in coating plants designed for applying primer-surfacers based on organic solvents result from the structural length of the evaporation zone and the belt speed predetermined by the production target for the bodywork coating process (number of car bodies to be coated per time unit). In the case of primer-surfacer coating agents based on organic solvents, this evaporation is sufficient; for waterborne primer-surfacers, this is not the case. This means that the possibility of working with waterborne primer-surfacers within coating plants which only allow evaporation but no pre-drying at elevated temperature is ruled out.

U.S. Pat. No. 6,548,119 B1 discloses a process for producing a two-layer color and/or special-effect topcoat on vehicle bodies in an automatic vehicle production coating plant. In this process, a transparent topcoat layer is applied from a clear coating agent to a base coat layer applied from a waterborne color and/or special-effect base coat, which has been allowed to evaporate prior to application of the clear coat, and the two coatings are baked together. A waterborne base coat paint is used in this process which contains organic solvents and which has a high solids value of 40 to 70%. After a layer of the waterborne base coat has been applied and before the transparent topcoat layer is applied, the base coat layer is allowed to evaporate for 30 to 180 seconds with circulating air at 25 to 45° C. and with an air throughput of 0.10 to 0.70 m/s in relation to the surface area provided with the waterborne base coat layer.

It is desirable to provide a process for producing multi-layer coatings comprising a waterborne primer-surfacer layer and a topcoat layer on uncoated or pre-coated substrates while ensuring there is only an evaporation phase of the kind typical of non-aqueous primer-surfacers. In particular, the process should make it possible to work with waterborne primer-surfacers in an automated production coating plant which is designed for working with non-aqueous primer-surfacers and only allows for evaporation without subsequent pre-drying of the primer-surfacer coating layers.

SUMMARY OF THE INVENTION

This object can be achieved by observing the conditions below when formulating waterborne primer-surfacer coating agents and by observing the process conditions below during evaporation of the coatings applied therefrom.

The invention therefore relates to a process for producing multi-layer coatings on substrates that comprises a waterborne primer-surfacer layer and a topcoat applied thereto, in which a waterborne primer-surfacer layer is applied from a waterborne primer-surfacer to substrates and baked and then a topcoat is applied, characterized in that the waterborne primer-surfacer has a binder solids content with a hydroxyl number of 100 to 250 mg KOH/g and contains free or blocked polyisocyanate as a curing agent (crosslinking agent) for the hydroxy-functional binder or binders in a molar ratio of OH/NCO of more than 2:1 to 5:1, preferably more than 2:1 to 3:1, and in which, after it has been applied and before baking, the waterborne primer-surfacer layer is allowed to evaporate for 30 to 300 seconds at 15 to 40° C.

DETAILED DESCRIPTION OF THE EMBODIMENTS

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference in their entirety.

The molar ratio of OH of the binder components/NCO of the polyisocyanate curing agent is more than 2:1 to 5:1 and is a feature essential to the invention. Allowing the molar ratio of OH/NCO to fall below this value carries the risk that the waterborne primer-surfacers used in the process according to the invention will have rheological properties which do not permit application by spraying. For example, a marked thixotropic effect may be brought about, which makes it impossible to atomize using the conventional spraying equipment available in coating plants.

The term "molar ratio of OH/NCO" used in the description and the claims defines the crosslinking stoichiometry of the resin solid (sum of the binder solids and the solids contributed by the curing agent(s)) in the waterborne primer-surfacer. Here, both blocked isocyanate groups and free isocyanate groups are calculated as NCO groups. This means that the molar ratio of OH/NCO may mean the ratio of OH groups in the binder solids to free NCO groups of polyisocyanate curing agent in the resin solids, or to blocked NCO groups of blocked polyisocyanate curing agent in the resin solids, or the waterborne primer-surfacer contains both free and blocked polyisocyanate. In this last case, the molar ratio of OH/NCO signifies the ratio of OH groups in the binder solids to the total free and blocked NCO groups in the free and blocked polyisocyanate curing agent(s) in the resin solids.

According to the invention, waterborne primer-surfacers are used. In addition to water, at least one hydroxy-functional binder, at least one free or blocked polyisocyanate curing agent, at least one extender (filler) and, optionally, other binders or curing agents, they may also contain, for example, organic solvents, pigments and/or additives that are conventional in coatings. The waterborne primer-surfacers used in the process according to the invention have, for example, solid contents of 45 to 65% by weight. The solid content by weight in the waterborne primer-surfacers is formed by the resin solids, pigments, extenders and non-volatile additives that are conventional in coatings. The ratio by weight of pigment plus extender to resin solids is, for example, 0.5:1 to 1.6:1.

In addition to the evaporation conditions which are to be observed in accordance with the invention for the waterborne primer-surfacer layer, and which will be explained below, it is an essential feature of the invention that the waterborne primer-surfacers have a binder solids content with a hydroxyl number of 100 to 250 mg KOH/g, preferably from 150 to 220 mg KOH/g, and contain free and/or blocked polyisocyanate as curing agent for the hydroxy-functional binders in a molar ratio of OH/NCO of more than 2:1 to 5:1, preferably, more than 2:1 to 3:1. With hydroxyl numbers in the lower part of the range, the molar ratio of OH/NCO is preferably at the lower end.

The waterborne primer-surfacers may be one-pack systems or, if they contain free polyisocyanate curing agents, two-pack systems. In either case, they are coating agents which are curable to form urethane groups.

The binders contained in the waterborne primer-surfacers are conventional ionically, preferably anionically, and/or non-ionically stabilized binders. Anionic stabilization is preferably achieved by at least partly neutralized carboxyl groups in the binder, whereas non-ionic stabilization is preferably achieved by lateral or terminal polyethylene oxide units in the binder.

The binders as such are conventional binders known to those skilled in the art, for example, conventional polyester resins, alkyd resins, polyurethane resins, (meth)acrylic copolymer resins or hybrid polymers derived from these classes of binders.

Examples of polyisocyanates which may be used in the waterborne primer-surfacers in free or blocked form as curing agents are nonane triisocyanate, toluylene diisocyanate, diphenylmethane diisocyanate, phenylene diisocyanate, naphthylene diisocyanate, xylylene diisocyanate, tetramethylxylylene diisocyanate and (cyclo)aliphatic diisocyanates, such as, 1,6-hexane diisocyanate, trimethylhexane diisocyanate, 1,12-dodecane diisocyanate, cyclohexane diisocyanate, isophorone diisocyanate, bi-cyclohexylmethane diisocyanate or mixtures thereof and polyisocyanates derived from these diisocyanates, for example, those containing heteroatoms in the residue linking the isocyanate groups. Examples of these are polyisocyanates having carbodiimide groups, allophanate groups, isocyanurate groups, uretdione groups, urethane groups and/or biuret groups.

Suitable blocking agents for the polyisocyanate curing agents described above are the conventional ones, such as CH-acidic, NH—, SH—or OH-functional blocking agents. Examples are acetyl acetone, alkyl acetoacetate, dialkyl malonate, aliphatic or cycloaliphatic alcohols, oximes, lactams, imidazoles, pyrazoles and triazoles.

In the production of the waterborne primer-surfacers, the free or blocked polyisocyanates may be added as such or as a preparation containing water and/or organic solvent.

In addition to free or blocked polyisocyanate curing agent, the waterborne primer-surfacers may also contain additional curing agents in quantities of, for example, up to 20 and preferably, not more than 10% by weight of the resin solids. Examples of additional curing agents are amino resins, such as benzoguanamine resins or melamine resins.

The waterborne primer-surfacers used in the process according to the invention contain conventional extenders and, optionally, color and/or special-effect pigments. Examples of extenders are silicon dioxide, barium sulphate, talcum and kaolin. Examples of inorganic or organic color pigments are titanium dioxide, iron oxide pigments, carbon black, azo pigments, phthalocyanine pigments, quinacridone pigments, pyrrolopyrrole pigments and perylene pigments. Examples of special-effect pigments are metal pigments, e.g. of aluminum, copper or other metals; interference pigments such as metal oxide-coated metal pigments, e.g. titanium dioxide-coated aluminum, coated micas such as titanium dioxide-coated mica, pigments having a graphite effect, platelet-like iron oxide and platelet-like copper phthalocyanine pigments.

The waterborne primer-surfacers may contain additives that are conventional in coatings in quantities that are conventional in coatings, for example, in a total quantity of 0.1 to 10% by weight, in relation to their resin solids content. Examples of additives are wetting agents, adhesion-promoting substances, catalysts, levelling agents, anti-cratering agents and thickeners.

In particular, it has proved advantageous if the waterborne primer-surfacers contain 0.1 to 7.5% by weight, in relation to the resin solids content, of a defoaming agent based on mineral oil and/or on fatty acid (ester)s. Examples are Agitan® 281 (from Münzing Chemie in Heilbronn), Additol® VXW 4909, Additol® VXW 4926 and Additol® VXW 4973 (all from Surface Specialties).

The waterborne primer-surfacers generally also contain one or more organic solvents in quantities of a total of, for example, 2 to 15% by weight.

The composition of organic solvents in the waterborne primer-surfacers here preferably comprises 70 to 100% by weight of high-boiling solvents that are conventional in coatings, for example, boiling at 150° C. or above, up to, for example, at below 280° C. Examples are 2-ethyl hexanol, benzyl alcohol, isodecanol, isotridecyl alcohol, ethylene glycol, propylene glycol, diethylene glycol, dipropylene glycol, butyl glycol, butoxypropanol, butyl diglycol, butyl triglycol, ethyl diglycol, ethyl triglycol, hexyl glycol, methoxybutanol, methyl diglycol, diethylene glycol dimethyl ether, dipropylene glycol methyl ether, dipropylene glycol dimethyl ether, dipropylene glycol butyl ether, butyl glycol acetate, butyl diglycol acetate, 3-methoxybutyl acetate, ethoxypropyl acetate, ethyl glycol acetate, ethylethoxy propionate, dimethylformamide, N-methyl pyrrolidone, propylene carbonate and aliphatic, aromatic or terpene hydrocarbons boiling in the respective temperature range.

Examples of low-boiling organic solvents, for example, boiling below 150° C., which may be contained in the waterborne primer-surfacers and preferably make up no more than 30% by weight of the organic solvent composition in the waterborne primer-surfacers, are C1–C4-alcohols, ethyl acetate, butyl acetate, ethyl glycol, methoxypropanol, methoxypropyl acetate, methyl ethyl ketone, methyl isobutyl ketone and aliphatic, aromatic or terpene hydrocarbons boiling in the respective temperature range.

The process according to the invention comprising application, evaporation stage and baking of the waterborne primer-surfacers generally happens in an production coating plant, in particular, in an automated production coating plant.

In the process according to the invention, the waterborne primer-surfacers are applied to substrates which may be made from a single material or from a plurality of materials combined with one another in a mixed construction. In general, they are metal or plastics substrates. Glass substrates, such as windshields and windows, and transparent plastic substrates and coverings, which are meant to remain transparent, are not included herein. These are typically pre-treated, that is to say plastics substrates may, for example, be provided with a plastics primer, and metal substrates generally have an electrodeposition primer, in particular, a cathodic electrodeposition coating. The substrates are preferably motor vehicle bodies or body parts.

The waterborne primer-surfacers are applied by spraying in one or more spray-application steps, in a dry film thickness of, for example, 15 to 50 μm, preferably 20 to 40 μm.

In addition to the conditions to be observed which are mentioned above, in formulating the waterborne primer-surfacers used in the process according to the invention, it is an essential feature of the invention that the coatings applied from the waterborne primer-surfacers are allowed to evaporate (in order to remove water and optional organic solvent) after they have been applied and before baking for 30 to 300 seconds, preferably, 60 to 240 seconds, at 15 to 40° C. (air temperature), preferably, under circulating air conditions and in this case, in particular with an air throughput of, for example, 0.10 to 0.70 m/s, preferably 0.15 to 0.60 m/s, in relation to the surface provided with the waterborne primer-surfacer layer. There is no need for an additional pre-drying step at an elevated temperature (compared to the temperature prevailing during evaporation), for example, a 10–14 minute pre-drying with warm air at 60 to 100° C. and accordingly, such pre-drying does preferably not happen, in other words, preferably there is only the evaporation step and no pre-drying step.

The stage of allowing the applied waterborne primer-surfacer layer to evaporate is generally carried out in the primer-surfacer evaporation zone of a production coating plant, in particular, in the primer-surfacer evaporation zone within an automotive production coating plant. This will be explained with reference to the example of automotive production coating. During this, the time of 30 to 300 seconds for the evaporation procedure results from the structural length of the primer-surfacer evaporation zone of the automotive production coating plant of, for example, 5 to 30 m and the belt speed prevailing there of, for example, 3 to 10 m/min.

In the case of the preferred circulating air operation, the air throughput in relation to the surface area coated with waterborne primer-surfacer is, for example, 0.10 to 0.70 m/s. This is calculated as the quotient of the volume of air passing through the evaporation zone per second in cubic meters and the surface area in the evaporation zone which has been coated with waterborne primer-surfacer and is to be allowed to evaporate, for example, in the order of 20 to 200 square meters. The volume of air passing through the evaporation zone in the process according to the invention is, for example, 1 to 2 cubic meters per linear meter of the evaporation zone per second. The surface area in the evaporation zone which has been coated with waterborne primer-surfacer and is to be allowed to evaporate is calculated from the number of coated vehicle bodies which are in the primer-surfacer evaporation zone at one time, for example, 1 to 5 bodies. Typically, that surface area of private car bodies that receive a primer surfacer coating is, for example, in the order of 15 to 35 square meters and in the case of commercial vehicles, it is in the order of 20 to 65 square meters.

The surface area that receives a primer-surfacer coating here means not only the surface area of an individual body to be provided subsequently with the topcoat but also includes any parts of the surface area provided with the waterborne primer-surfacer which are not to be topcoated, for example, in the interior of the body.

If evaporation is performed, as preferred, under circulating air conditions, then, for example, the procedure may be such that the circulating air contains 5 to 15 g of water per cubic meter. In this case, it is also possible for a portion, for example, 5 to 20%, preferably 5 to 10%, of the volume of air passing through the evaporation zone per second to leave the evaporation zone as waste air and for a corresponding quantity of fresh air to be added, which is mixed into the circulated air. The fresh air preferably contains less than 15 g, particularly preferably 5 to 12 g, of water per cubic meter. The water content of the mixed-in fresh air may be adjusted by means of conventional air dehumidifying methods such as the compression of air and/or condensation or absorption of the water from the air.

The circulating air is advantageously moved at a flow rate of 4 to 8 m/s, as measured at the substrate. Preferably, it is a turbulent air flow which is directed downwards and from the sides onto the substrate which has been provided with the primer-surfacer layer which is to be allowed to evaporate, for example, a car body. The air is advantageously supplied evenly and perpendicular to the primer-surfacer layer which is to be allowed to evaporate. The air is advantageously drawn off downwards.

The evaporation zone may be operated under constant operating conditions or with variation of individual or a plurality of operating parameters. A variation in the operating parameters may be performed by a continuous or abrupt change over the entire structural length or over one or more parts of the structural length of the evaporation zone. In this case, the evaporation zone may be divided into one or more, preferably 1 to 3, zones which may be separated from one another by air locks. The variation in the operating parameters during the evaporation is, however, always within the limits predetermined by the invention for the evaporation step when regarded as a whole. For example, it is possible for the evaporation zone to be divided into 2 zones with the bodies coated with waterborne primer-surfacer first being allowed to evaporate in the first zone at low air temperatures, for example, from 15 to 30° C., and then in the second zone at higher air temperatures, for example, from 30 to 40° C.

With air circulation, the air throughput may, for example, be selected to be at the same level in both zones or to be different, for example, being lower in the first zone than in the second; for example, the flow rate of the circulating air, as measured at the substrate, may be above 8 m/s in the second zone. If the evaporation zone or the evaporation procedure is regarded as a whole, however, the average air throughput is within the predetermined limits.

The waterborne primer-surfacer layers, which have evaporated, are thermally cured in a conventional manner, for example, by baking them at object temperatures of from 80 to 170° C. The baked waterborne primer-surfacer layers are free of blistering, although they have not undergone any pre-drying at elevated temperature before the baking, as is conventional per se for waterborne primer-surfacers.

Once the waterborne primer-surfacer layer has been baked, a conventional color and/or special-effect topcoat may be applied in a conventional manner known to those skilled in the art, either as a one-layer topcoat or as a two-layer topcoat comprising a color and/or special-effect base coat layer and a protective, gloss-imparting clear coat layer.

The process according to the invention allows multi-layer coatings comprising waterborne primer-surfacer and topcoat to be produced, in which the waterborne primer-surfacer merely has to be allowed to evaporate before baking, and does not need any pre-drying at elevated temperature. Using the process according to the invention, it is possible to work with waterborne primer-surfacers in automated production coating plants which are intrinsically designed for working with non-aqueous primer-surfacers and allow only an evaporation phase but no additional pre-drying phase for the primer-surfacer layers. A complex restructuring of coating plants, which are intrinsically unsuitable for working with waterborne primer-surfacers, can be avoided. As long as the conditions which are essential features of the invention are observed in the formulation of the waterborne primer-surfacers and the evaporation conditions which are essential to the invention are observed for the waterborne primer-surfacer layers, the process according to the invention may even be carried out such that within one production coating plant both the waterborne primer-surfacers and non-aqueous primer-surfacers are applied.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

The following Examples illustrate the invention. All parts and percentages are on a weight basis unless otherwise indicated.

EXAMPLE

Simulation of Coating of a Car Body Under Practical Conditions:

a) A waterborne primer-surfacer of the following composition was made in a conventional manner (grinding pigments and extenders in a portion of the binder, mixing in any missing binder and any missing ingredient):

43.2 parts by weight of Resydrol®AM224w/40 WA (40% by weight aqueous dispersion of a fatty acid-modified alkyd resin with a hydroxyl number of 217 mg KOH/g of resin solids, from Surface Specialties), 0.5 parts by weight of a 75% by weight solution of Surfynol® 104H (from Air Products) in ethyl glycol, 17 parts by weight of titanium dioxide, 0.2 parts by weight of carbon black, 11.5 parts by weight of barium sulphate, 1 part by weight of talcum, 11 parts by weight of Rhodocoat® WT 1000 (63% by weight aqueous dispersion of an aliphatic polyisocyanate blocked with methyl ethyl ketoxime and having a latent NCO content of 14.9% by weight, in relation to resin solids; from Rhodia Syntech GmbH), 1 part by weight of an aliphatic hydrocarbon mixture boiling in the range from 184 to 217° C., 2 parts by weight of N-methyl pyrrolidone, 2 parts by weight of butyl diglycol, 1 part by weight of Agitan® 281 (defoaming agent based on mineral oil, from Münzing Chemie), 0.1 parts by weight of dimethyl ethanolamine, 9.5 parts by weight of deionized water.

The molar ratio of OH/NCO in the resin solids of the waterborne primer-surfacer was 2.7:1.

b) In a coating booth for test purposes, a car body was coated: A car body 4.3 m long and coated with an electrodeposition primer layer was spray-coated to a dry film thickness of 30 μm using the waterborne primer-surfacer from Example a). The coated surface area was approximately 20 square meters. Then it was allowed to evaporate for 2 minutes in an evaporation zone 5 m long with air circulation (water content 12 g per cubic meter) at 20° C. The circulating air throughput was 1.5 cubic meters per second and per linear meter of the evaporation zone. Then, baking was carried out at 150° C. (object temperature) for 18 minutes. The primer-surfacer layer obtained was free of blistering and could be coated over in a conventional manner with a base coat/clear coat two-layer coating.

What is claimed is:

1. A process for producing a multi-layer coating on a substrate which comprises the following steps:

applying a waterborne primer-surfacer layer to the substrate, allowing evaporation of water and optional organic solvent from the waterborne primer-surfacer layer for 30 to 300 seconds at 15 to 40° C., baking the waterborne primer-surfacer layer and applying a topcoat layer to the waterborne primer-surfacer layer to form a multi-layer coating on the substrate;

wherein the waterborne primer-surfacer has a binder solids content with a hydroxyl number of 100 to 250 mg KOH/g and contains free polyisocyanate or blocked polyisocyanate as a crosslinking agent (crosslinking agent) for the hydroxy-functional binder(s) in a molar ratio of OH/NCO of more than 2:1 to 5:1;

whereby the binder crosslinks only by baking and only via an OH/NCO reaction.

2. The process of claim 1, wherein the waterborne primer-surfacer contains 0.1 to 7.5% by weight, in relation to the resin solids, of a defoaming agent selected from the group consisting of defoaming agents based on mineral oil, defoaming agents based on fatty acids and defoaming agents based on fatty acid esters and combinations thereof.

3. The process of claim 1, wherein the waterborne primer-surfacer contains at least one organic solvent in a quantity of a total of 2 to 15% by weight.

4. The process of claim 3, wherein the at least one organic solvents comprise 70 to 100% by weight of a solvents or solvents having a boil point greater than or equal to 150° C. and less than 280° C.

5. The process of claim 1, wherein the substrates are selected from motor vehicle bodies and body parts.

6. The process of claim 1, wherein the evaporation takes place under circulating air conditions with an air throughput of 0.10 to 0.70 m/s in relation to the surface area provided with the waterborne primer-surfacer layer.

7. The process of claim 1, wherein the topcoat is selected from the group consisting of one-layer topcoat and two-layer topcoat comprising base coat layer and clear coat layer.

* * * * *

UNITED STATES PATENT AND TRADEMARK OFFICE
CERTIFICATE OF CORRECTION

PATENT NO.         : 7,166,331 B2                                             Page 1 of 1
APPLICATION NO. : 10/842218
DATED              : May 3, 2005
INVENTOR(S)       : Michael Becker, Werner Bosch and Thimo Lothert It is certified that error appears in the above-identified patent and that said Letters Patent is hereby corrected as shown below:

Claim 1, Col. 9, Line 4:     "(crosslinking agent)" to be deleted

Claim 4, Col. 10. Line 2:    "solvents comprise 70 to 100% by weight of a solvents" to be replaced by --solvent comprises 70 to 100% by weight of a solvent--

Signed and Sealed this

Twenty-seventh Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,166,331 B2 | Page 1 of 1 |
| APPLICATION NO. | : 10/842218 | |
| DATED | : January 23, 2007 | |
| INVENTOR(S) | : Michael Becker, Werner Bosch and Thimo Lothert | |

It is certified that error appears in the above-identified patent and that said Letters Patent is hereby corrected as shown below:

Claim 1, Col. 9, Line 4:   "(crosslinking agent)" to be deleted

Claim 4, Col. 10. Line 2:   "solvents comprise 70 to 100% by weight of a solvents" to be replaced by --solvent comprises 70 to 100% by weight of a solvent--

This certificate supersedes Certificate of Correction issued March 27, 2007.

Signed and Sealed this

Seventeenth Day of April, 2007

JON W. DUDAS
*Director of the United States Patent and Trademark Office*